(12) United States Patent
Kohzuki et al.

(10) Patent No.: US 6,912,225 B1
(45) Date of Patent: Jun. 28, 2005

(54) PACKET FORWARDING DEVICE AND PACKET PRIORITY SETTING METHOD

(75) Inventors: Kiyoshi Kohzuki, Himeji (JP); Takeshi Aimoto, Santa Clara, CA (US); Yoshihiko Sakata, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/572,955

(22) Filed: May 18, 2000

(30) Foreign Application Priority Data

May 21, 1999 (JP) .......................................... 11-141164

(51) Int. Cl.⁷ .............................................. H04L 12/28
(52) U.S. Cl. ...................... 370/412; 370/236; 370/395
(58) Field of Search ............................ 370/236.1, 229, 370/230, 448, 455, 412, 232, 413, 389–395, 236, 535, 429, 462, 416; 455/560, 512; 709/232, 235, 234

(56) References Cited

U.S. PATENT DOCUMENTS

| | | | | |
|---|---|---|---|---|
| RE32,789 E | * | 11/1988 | Lynk et al. ................. | 455/512 |
| 5,541,922 A | * | 7/1996 | Pyhalammi ................. | 370/462 |
| 5,694,554 A | * | 12/1997 | Kawabata et al. .......... | 370/412 |
| 5,790,522 A | * | 8/1998 | Fichou et al. ............... | 370/236 |
| 5,974,465 A | * | 10/1999 | Wong .......................... | 709/234 |
| 6,266,324 B1 | * | 7/2001 | Kirino et al. ................ | 370/230 |
| 6,389,018 B1 | * | 5/2002 | Clauberg ...................... | 370/394 |
| 6,408,006 B1 | * | 6/2002 | Wolff .......................... | 370/412 |
| 6,657,964 B1 | * | 12/2003 | Kohzuki et al. .......... | 370/236.1 |

FOREIGN PATENT DOCUMENTS

| | | |
|---|---|---|
| DE | 19737852 | 3/1999 |
| JP | 9-307566 | 11/1997 |

OTHER PUBLICATIONS

Braden, R. et al, "Integrated Services in the Internet Architecture: An Overview", RFC 1633, IETF, Jun. 1994, pp. 1–33.

Clark, David et al, "Supporting Real–Time Applications in an Integrated Services Packet Network: Architecture and Mechanism", COMM, vol. 22, No. 4, Aug. 20, 1992, pp. 14–26.

Floyd, Sally et al, "Link–Sharing and Resource Management Models for Packet Networks", IEEE, vol. 3, No. 4, Aug. 1, 1995, pp. 365–386.

Wu–chang Feng et al, "Adapative Packet Marking for Providing Differentiated Services in the Internet", IEEE, Oct. 13–16, 1998, pp. 108–117.

Blake, S. et al, "An Architecture for Differentiated Services", IETF, "Online", RFC 2475, Dec. 31, 1998, pp. 1–36.

* cited by examiner

*Primary Examiner*—Chi Pham
*Assistant Examiner*—Prenell Jones
(74) *Attorney, Agent, or Firm*—Mattingly, Stanger, Malur & Brundidge, P.C.

(57) ABSTRACT

A packet forwarding device with a shaping unit, which is provided with queues for storing high priority packets and queues for storing low priority packets. The shaping unit transmits a packet read out from the non priority queue by giving a high priority when no transmit-wait packet exist in the priority queue even though the time to transmit a packet from the priority queue is reached.

15 Claims, 8 Drawing Sheets

| Timing | Queue | Read Data | | | Write Data | | |
|---|---|---|---|---|---|---|---|
| | | Packet Validity Flag | Time Validity Flag | Scheduled Transmission Time | Packet Validity Flag | Time Validity Flag | Scheduled Transmission Time |
| Packet Receiving Timing | d.c. | 0 | 0 | d.c. | 1 | 1 | Time1300 |
| | | | 1 | Past/Present | 1 | 1 | Time1300 |
| | | | | Future | 1 | 1 | No Renewal |
| | | 1 | d.c. | d.c. | 1 | 1 | No Renewal |
| Packet Transmission Timing | High Priority | 1 | d.c. | d.c. | 0 or 1 | 1 | Time1301 |
| | Low Priority | 1 | d.c. | d.c. | 0 or 1 | 1 | Time1300 | d.c. = don't care

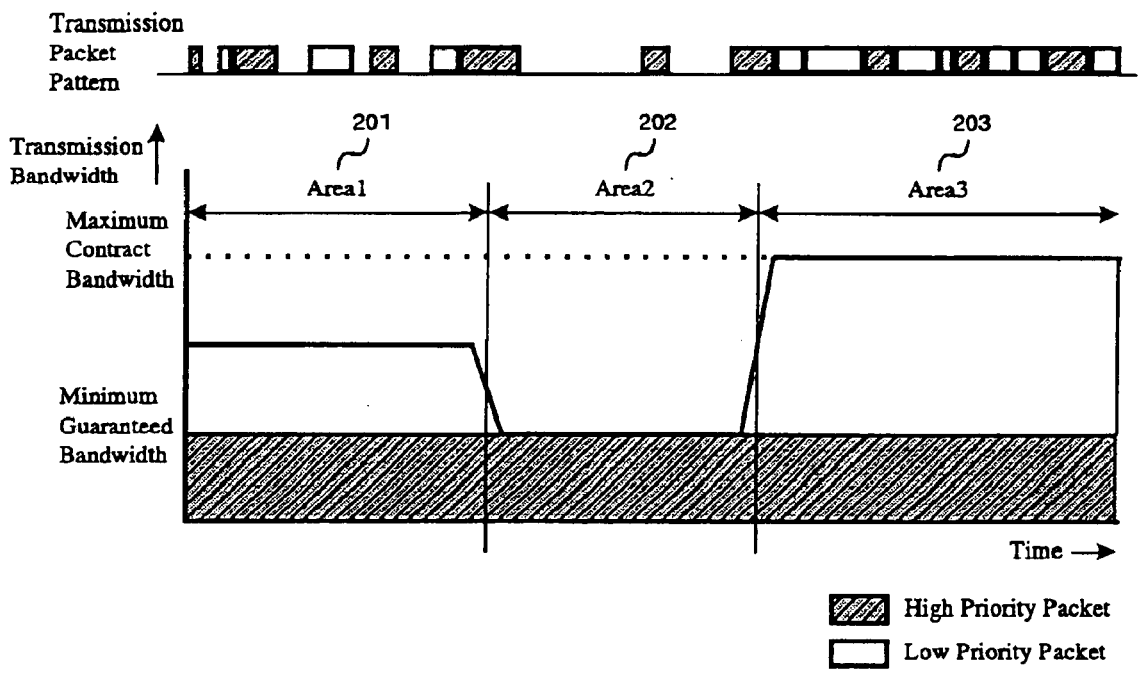

| Timing | Cell | Queue | Read Data ||| Write Data |||
|---|---|---|---|---|---|---|---|---|
| | | | Packet Validity Flag | Time Validity Flag | Scheduled Transmission Time | Packet Validity Flag | Time Validity Flag | Scheduled Transmission Time |
| Cell Receiving Timing | Last | d.c. | 0 | 0 | d.c. | 1 | 1 | Time 7300 |
| | | | | 1 | Past/Present | 1 | 1 | Time 7300 |
| | | | | | Future | 1 | 1 | No Renewal |
| | | | 1 | d.c. | d.c. | 1 | 1 | No Renewal |
| | not Last | d.c. | d.c. | d.c. | d.c. | No Renewal |||
| Cell Transmission Timing | Last | High Priority | 1 | d.c. | d.c. | 0 or 1 | 1 | Time 7301 |
| | | Low Priority | 1 | d.c. | d.c. | 0 or 1 | 1 | Time 7300 |
| | not Last | d.c. | d.c. | d.c. | d.c. | No Renewal ||| d.c. = don't care

PACKET FORWARDING DEVICE AND PACKET PRIORITY SETTING METHOD

BACKGROUND OF THE INVENTION (1) Field of the Invention

The present invention relates to a packet forwarding device connected to a packet forwarding network, and more specifically to a traffic shaping unit provided within the packet forwarding device.

(2) Description of the Related Art

The packets are different in length every protocols. There are known those variable in length every packets as in the case of an IP (Internet Protocol) and those each having a fixed length as in an ATM (Asynchronous Transfer Mode). Low-cost services have recently been applied to a public packet network. Attention has been focused on a Virtual Private Network (VPN) wherein a plurality of private networks are connected to one another through a public packet network.

The packets are different in length depending on the protocol. There are known those protocols in which every packet is variable in length, as in the case of an IP (Internet Protocol), and those in which each packet has a fixed length, as in an ATM (Asynchronous Transfer Mode) protocol. Additionally, low-cost services have recently been applied to a public packet network, and attention has been focused on a Virtual Private Network (VPN) wherein a plurality of private networks are connected to one another through a public packet network.

A diagram of connections between enterprise networks through a public network is shown in FIG. 2.

In FIG. 2, a private network A41 and a private network B42 are connected to each other through a public network 40. When communications are carried out through a public network, each user normally makes a contract for a transmission bandwidth and packet forwarding priorities with a manager for the public network before packet forwarding.

When the contract is established between each of the users and the public network manager and a terminal starts to transfer or forward packets to the public network, a packet forwarding device 402 located at the entrance of the public network monitors a transmission bandwidth for each terminal in order to make lower the priority of packets from a terminal which violates the contents of the contract or to discard violation packets. This monitoring function on the public network side will be referred to as UPC (Usage Parameter Control). Even if a packet is discarded in the course of communications, a receiving terminal is normally provided with the function of recognizing the occurrence of a packet discard and requesting a packet retransmission to a transmitting terminal, whereas the transmitting terminal is provided with the function of retransmitting the packet. Therefore, there is no omission of information in final. However, it is desirable to avoid the occurrence of the packet discard because this could lead to a great increase in transfer delay and a congestion of networks due to retransmitted packets.

Thus, a packet forwarding device 401, which is transmitting packets to the public network, needs to transmit the packets under the control of a transmission bandwidth in such a manner that the packets will not be discarded by UPC of the public network. The function of controlling this packet transmission bandwidth is referred to as traffic shaping function or simply called shaping function. There may be cases in which a shaping unit for implementing the shaping function is required for a user's transmitting terminal or an exit portion of a public network for transmitting packets to a private network as well as for the above-described packet forwarding device directly connected to the public network.

The service provided for each user by the public network, i.e., the contract established between the user and the public network manager is roughly classified into a contract under which packet are transmitted after a predetermined bandwidth is always ensured within the public network, and a best effort type contract under which packets are forwarded without ensuring a bandwidth within a public ATM network. The former is suitable for the transfer of voice or the like because the packet can be always transferred at a predetermined bandwidth without being affected by the volume of traffic for other users within the public network. The latter is normally cheaper than a fixed bandwidth contract although a transfer delay might increase depending on the volume of traffic for other users or packets might be discarded within the network. This has been used for the transfer of burst data or outbreak data traffics such as FTP (File Transfer Protocol), an electronic mail, etc.

There has recently been proposed a class which guarantees a predetermined bandwidth even when a public network is busy, while it is the best effort type contract. This is called "GFR (Guaranteed Frame Rate)" in ATM. In this class, the minimum guaranteed bandwidth and the maximum transfer bandwidth are contracted before the transfer of packets. When the public network is not busy, the packets are forwarded at the maximum transfer bandwidth, whereas packets corresponding to the minimum guaranteed bandwidth is surely transferred even when the network becomes busy.

A method of implementing the shaping unit has been described in, for example, "Traffic Shaping Unit" disclosed in Japanese Published Unexamined Patent Application No. Hei 9-307566 (Prior Art 1). The Prior Art 1 has described an ATM. A fixed-length packet employed in the ATM is generally referred to as "cell" in particular. In the Prior Art 1, queues are provided every contract units (e.g., VC: Virtual Connections) at which it is desired to perform shaping. Upon transmission of cells, a time at which the next cell can be transmitted at a cell-transmitted VC (hereinafter called "scheduled transmission time"), is calculated and stored by using a binary tree structure.

In this case, scheduled transmission times at respective VC are stored at the bottom of a binary tree. Further, VC at earlier scheduled transmission times, which correspond to those lying in the past on a time basis, go up while surpassing others, and VC at the earliest scheduled transmission time is finally selected. Thus, a scheduled transmission time, which correspond to one of values at the bottom of the binary tree, for VC to be transmitted with the highest priority is stored at the top of the binary tree.

The calculation and sorting of each scheduled transmission time are carried out even when a cell is received in a transmit-wait cell-free state as well as upon cell transmission. Thus, since the sorting can be performed using a sorting result indicated by the binary tree structure at the preceding cell transmission, VC to be transmitted with the highest priority can be selected in a processing time of the order of log{VC number}.

Important packets and packets not important in particular exist in mixed form within packets which have been transmitted to a communication path or channel. Here, the important packets are packets for traffics needed for low delay transfer, such as "telnet", etc., whereas the packets not important so far are packets for traffics, which are placed under a less influence even if the delay increases as in the case of the electronic mail.

It is important to perform such priority control that when the important packets and the packets not important so far exist in mixed form in this way, the important packets are preferentially transmitted ahead of others even when the network is being congested. Therefore, a header of the normal packet includes a field for indicating the priority of the packet. For example, a TOS (Type of Service) field is prepared for an IP packet, whereas a CLP (Cell Loss Priority) bit is prepared for an ATM cell. Incidentally, the priority will be explained hereinafter as two stages, high priority and low priority, in the interest of simplicity. However, each IP packet can be also given a further detailed priority. Further, a packet to which a high priority is assigned, will be described as a high priority packet, and a packet to which a low priority is assigned, will be described as a low priority packet.

When the conventional shaping unit is applied to the best effort type service which carries out a bandwidth guarantee, all the packets are transmitted with high priority. Each high priority packet, which has exceeded the guarantee bandwidth, is lowered in priority by the UPC function. Since, at this time, the high priority packet and low priority packet are determined without taking into consideration the above-described important packets or non-important packets, an important "telnet" packet might be assigned to the low priority packet or a Web packet not important in particular might be assigned to the high priority packet. This is not a desirable priority assignment to users.

It is easy to assign the important packets to the high priority packets and assign the non-important packets to the low priority packets within the shaping unit. However, if shaping is not carried out in such a manner that the transmission bandwidth for high priority packets falls below the guaranteed bandwidth, then the priority is lowered at random by UPC. Therefore, this is not a desirable priority assignment to the users either. Further, when the volume of traffic for important packets is small, the guaranteed bandwidth cannot be effectively utilized. It is of importance that since a chief object to perform accounting is the guaranteed bandwidth, the guaranteed bandwidth is effectively utilized to the fullest.

SUMMARY OF THE INVENTION

A first object of the present invention is to provide a shaping unit wherein, among packets transmitted to the same destination, packets to be transmitted preferentially are transmitted at a guaranteed bandwidth contracted prior to packet transfer, and if there is allowance for a channel bandwidth, non priority packets are transmitted in such a manner that a bandwidth corresponding to the sum of a transmission bandwidth for the priority packets and a transmission bandwidth for the non priority packets falls below the maximum transfer bandwidth contracted prior to packet transfer.

A second object of the present invention is to provide a shaping unit wherein a priority assignment desirable for the aforementioned users is carried out and some of packets not important in particular are transmitted as high priority packets, thereby to effectively use the guaranteed bandwidth.

A third object of the present invention is to provide a shaping unit capable of coping with GFR service, which performs a bandwidth guarantee in units of an upper layer packets, in an ATM network.

In the present invention, for achieving the above first object, a shaping unit located within the line interface of a packet forwarding device is provided with a queue for storing high priority packets (hereinafter called a "priority queue") and a queue for storing low priority packets (hereinafter called a "non priority queue"), for each user. The priority queue and non priority queue may be prepared one by one for each user. Alternatively, a plurality of queues may exist for each priority class.

The shaping unit according to the present invention is also provided with a scheduled transmission time calculator for calculating a scheduled transmission time of a head or leading packet in transmit-wait packets stored in each priority queue so as to keep a guaranteed bandwidth, calculating a scheduled transmission time of a leading packet in transmit-wait packets stored in each non priority queue as an immediately transmitted time, and calculating a scheduled transmission time corresponding to a transmission bandwidth (maximum contracted bandwidth) integrating both of bandwidths of the priority queue and non priority queue. Further, the shaping unit includes a priority information supplement circuit for giving a high priority to a packet read out from the priority queue and giving a low priority to a packet read out from the non priority queue. Owing to the scheduled transmission time calculator and the priority information supplement circuit, important packets can be transmitted as high priority packets at a guaranteed bandwidth, and non priority packets can be transmitted as low priority packets at the remaining bandwidth which is the deference of the maximum contracted bandwidth and the guaranteed bandwidth.

The scheduled transmission time calculator may refer to a queue length (the number of stored packets) of each priority queue upon calculation of a scheduled transmission time for the priority queue and calculate an immediately transmittable time as the scheduled transmission time without keeping a guaranteed bandwidth when a predetermined or more amounts of packets are stored. Thus, it is possible to avoid such a phenomenon that the number of the packets stored in the priority queue increases due to shaping being executed, whereby the packets overflows from the queue.

In the present invention, for achieving the above second object, the priority information supplement circuit is provided with the function of giving a high priority to a transmit-wait packet read out from the non priority queue when no transmit-wait packet exists in the priority queue even though the time to transmit a packet from the priority queue is reached. Thus, even when the volume of traffic for the important packet is small, the whole guaranteed bandwidth is applied to the transmission of priority packets, whereby the guaranteed bandwidths can be effectively used.

In order to achieve the above third object, the shaping unit according to the present invention includes the function of detecting a final cell of an upper layer packet (hereinafter called EOP (End Of Packet) cell) and performing the above described processing on the transmission or reception of the IP packet only when the EOP cell is transmitted or received. It is thus possible to transmit and receive cells in units of a packet belonging to the upper layer and perform shaping adapted to GFR service.

BRIEF DESCRIPTION OF THE DRAWINGS

FIG. 12 is a conceptual diagram showing examples of a transmission bandwidth for the shaping unit 1 and packets to be transmitted.

FIG. 14 is a table depicting selection rules for a selector 732 provided within a scheduled transmission time calculator 73.

DESCRIPTION OF THE PREFERRED EMBODIMENTS

Figures 3, 5:
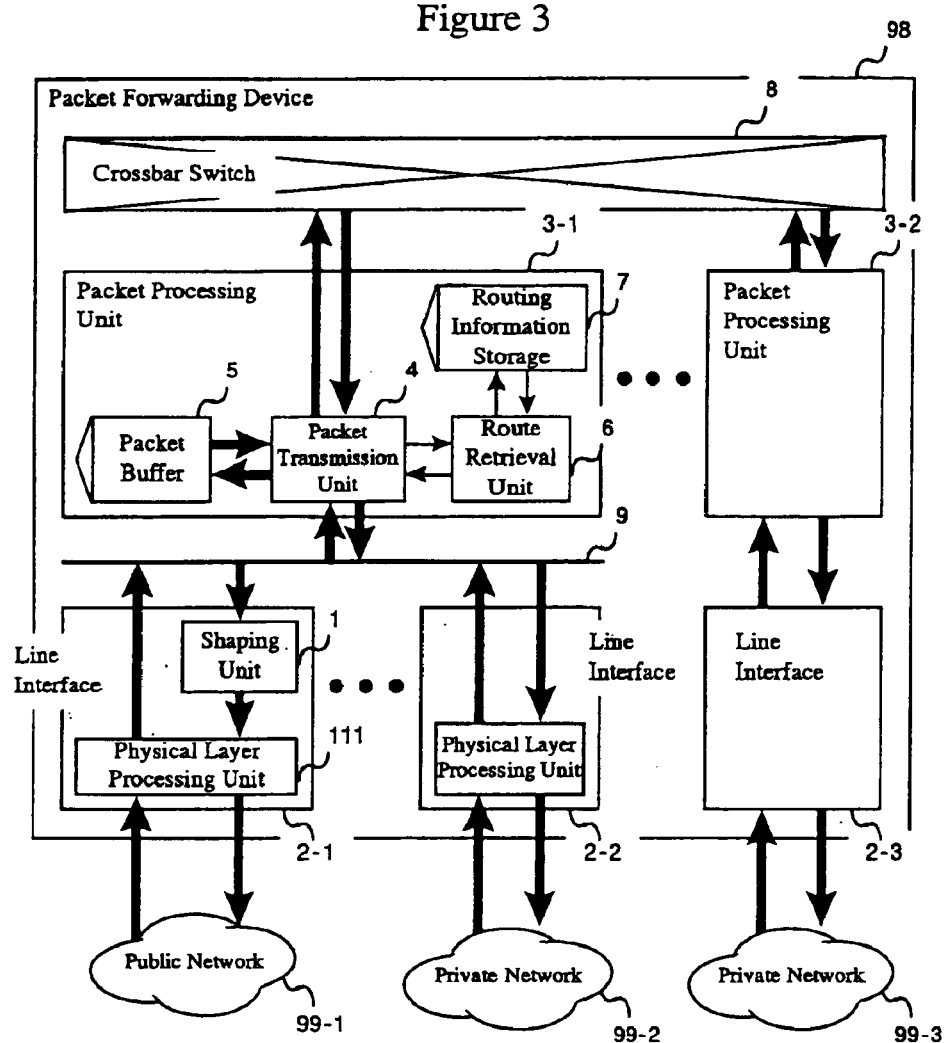
FIG. 3 is a block diagram depicting a configuration of one embodiment of a packet forwarding device.
FIG. 5 is a table illustrating selection rules for a selector 132 provided within a scheduled transmission time calculator 13.

FIG. 3 shows a configuration of a packet forwarding device to which the present invention is applied.

Figure 4:
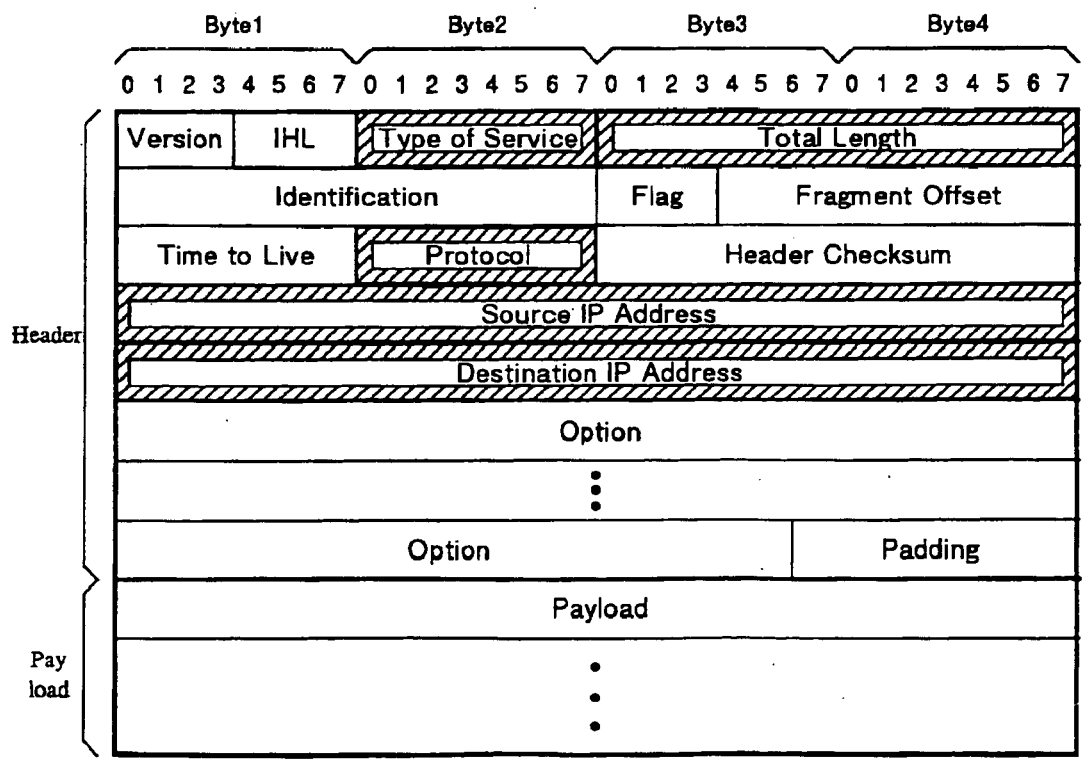
FIG. 4 is a diagram showing a format of an IP packet.

A packet will hereinafter be described as an IP packet. A format of the IP packet is shown in FIG. 4.

Referring to FIG. 3, a packet forwarding device 98 is connected to public networks 99-1 through 99-3. The packet forwarding device 98 comprises line interfaces 2-1 through 2-3 corresponding to the type of line (Ethernet, ATM, Frame Relay, etc.) connected thereto, packet processing units 3-1 through 3-2 for respectively determining the next transfer destinations, and a crossbar switch 8 for relaying the plurality of packet processing units.

While the plurality of line interfaces 2-1 and 2—2 are connected to one packet processing unit 3-1 by a bus 9 in FIG. 3, one line interface may be configured so as to be connected to one packet processing unit. While the plurality of packet processing units 3-1 through 3-2 are connected to each other by the crossbar switch 8 in FIG. 3 as well, the number of the packet processing units may be constructed as one. In this case, the crossbar switch 8 becomes unnecessary.

The operation of the packet forwarding device 98, which receives a packet therein, retrieves a transmission destination address and transmits or forwards a packet to a line corresponding to the result of retrieval, will next be described.

A packet received from the public network 99-2 is transmitted to a packet transmission unit 4 within the packet processing unit 3-1 through the line interface 2—2 and the bus 9. The packet transmission unit 4 temporarily stores the received packet in a packet buffer 5 and notifies to a route retrieval unit 6 a header in which information necessary for routing, such as a transfer destination IP address of the IP packet as shown in FIG. 4, etc. has been written.

The route retrieval unit 6 reads out a routing destination stored in a routing information storage 7, based on the transfer destination address in the header. The route retrieval unit 6 notifies the information about the routing destination obtained from the result of reading out to the packet transmission unit 4. The packet transmission unit 4 reads out the corresponding packet from the packet buffer 5 and forwards the read-out packet to the routing destination notified from the route retrieval unit 6.

Depending on the result of routing destination retrieval, a packet is transferred to its corresponding line interface via the crossbar switch 8, another packet processing unit and the bus. Otherwise, the packet is 1, directly transferred to its corresponding line interface via the bus 9. When the packet is forwarded to the public network 99-1, for example, the packet is transferred to the line interface 2-1 through the bus 9 and shaped by a shaping unit 1 to maintain or keep a bandwidth contracted with the public network 99-1, followed by transmission to the public network 99-1 through a physical layer processing unit 111. When the packet is transmitted to a private network, the need for shaping is generally low.

Figure 1:
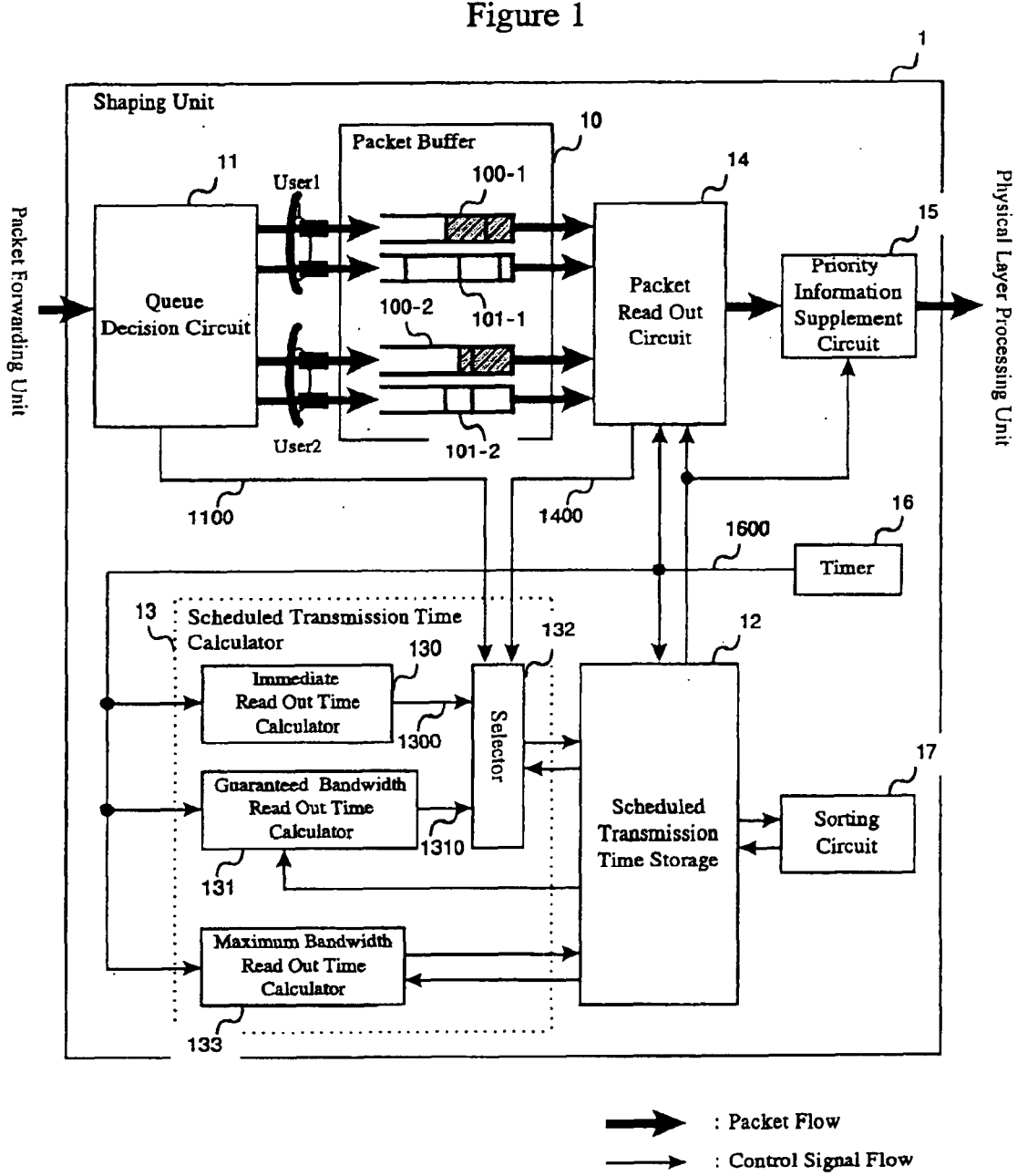
FIG. 1 is a block diagram showing a configuration of one embodiment of a traffic shaping unit to which the present invention is applied.
Figure 2:
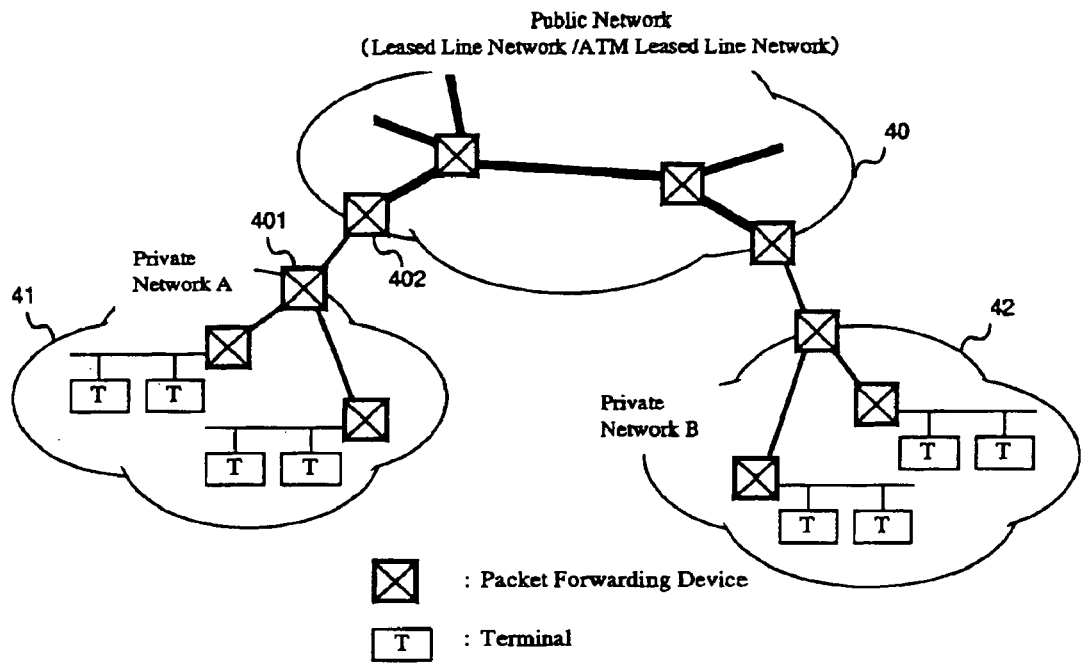
FIG. 2 is a diagram illustrating connections between enterprise networks through a public network.

FIG. 1 shows a block diagram of the shaping unit 1 provided within the line interface 2-1.

Referring to FIG. 1, the shaping unit 1 comprises a packet buffer 10 for temporarily queuing each packet, a queue decision circuit 11 for discriminating the priority of each of the received packets and determining a queue for queuing the received packet, a scheduled transmission time storage 12 for storing scheduled transmission times from a scheduled transmission time set for each queue to a scheduled transmission time for a queue to be transmitted with the highest priority for each user by using a binary tree structure and scheduled transmission times from a scheduled transmission time set for each user to a scheduled transmission time for a user to be transmitted with the highest priority by using a binary tree structure, a sorting circuit 17 for selecting the queue to be transmitted with the highest priority by using the scheduled transmission times stored in the scheduled transmission time storage 12 in the binary tree structure and writing back the result thereof to the scheduled transmission time storage 12 again, a schedule transmission time calculator 13 for calculating a scheduled transmission time for the corresponding output destination upon packet transmission and reception and allowing the scheduled transmission time storage 12 to hold or store the scheduled transmission time obtained by the result of the above calculation, a packet read out circuit 14 for reading out packets from the packet buffer 10 to transmit them out in accordance with the scheduled transmission time for each queue stored in the scheduled transmission time storage 12, a priority information supplement circuit 15 for giving priority information (high priority or low priority) to each packet to be transmitted, and a timer 16 for indicating the present time.

The packet buffer 10 comprises priority queues 100 which exist for each users, for example, a priority queue 100-1 for a user 1 and a priority queue 100-2 for a user 2 as shown in FIG. 1, for queuing priority packets to be transmitted within a guaranteed bandwidth, and non priority queues 101 for queuing non priority packets to be transmitted when a network is not busy or available a bandwidth outside the guaranteed bandwidth. These queues are designated at numerals 101-1 and 101-2 according to rules similar to those for the priority queues in FIG. 1.

The scheduled transmission time calculator 13 comprises an immediate read out time calculator 130 for calculating a scheduled transmission time 1300 used to immediately transmit the corresponding packet from the time of packet reception or transmission, a guaranteed bandwidth read out time calculator 131 for calculating a scheduled transmission time 1310 used to keep such a transmission interval as not to exceed the guaranteed bandwidth, a selector 132 for selecting writing of either of the two scheduled transmission times 1300 and 1310 into the scheduled transmission time storage 12 or non-writing of both of them into the scheduled transmission time storage 12, and a maximum bandwidth read out time calculator 133 for calculating a scheduled transmission time used to keep such a transmission interval as not to exceed the maximum contracted bandwidth.

Described specifically, the immediate read out time calculator 130 calculates the scheduled transmission time 1300 by using the present time 1600 notified from the timer 16 as follows:

Scheduled transmission time 1300=Present time+1

Namely, when there are no packets to be transmitted from other queues, the corresponding packet is immediately transmitted. Further, the guaranteed bandwidth read out time calculator 131 and the maximum bandwidth read out time calculator 133 calculate the scheduled transmission time 1310 according to such an algorithm that packets can be transmitted at a contracted bandwidth as an average even when scheduled transmission times for a plurality of VC compete with one another to cause fluctuations. If, for example, the leaky bucket algorithm described in "The ATM Forum TM4.0" or the like is used, then the aforementioned fluctuations are absorbed and packets can be transmitted at the contracted bandwidth as the average.

Figure 6:
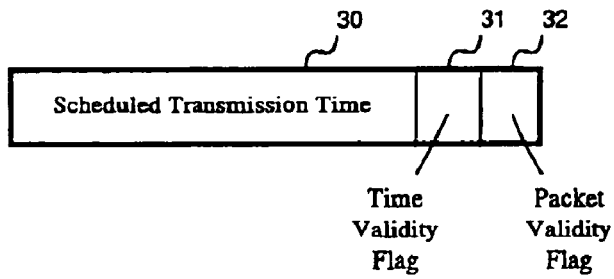
FIG. 6 is a diagram depicting a storage format of a memory 122 provided within a scheduled transmission time storage 12.
Figure 7:
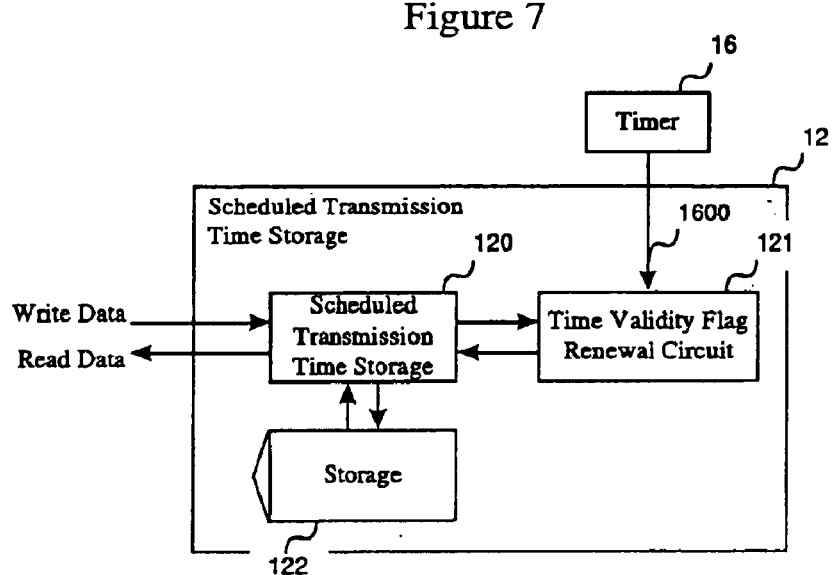
FIG. 7 is a detailed block diagram of the scheduled transmission time storage circuit 12.

A storage format of the scheduled transmission time storage 12 and a detailed block diagram thereof are shown in FIGS. 6 and 7 respectively.

As shown in FIG. 6, a scheduled transmission time 30, a time validity flag 31 indicating that the scheduled transmission time 30 is valid, and a packet validity flag 32 indicating that a transmission wait packet is stored in the queue, are stored in the scheduled transmission time storage 12 for each queue.

Further, as shown in FIG. 7, the scheduled transmission time storage 12 comprises a memory 122 for storing information about the scheduled transmission time, a memory control circuit (a scheduled transmission time storage) 120 for generating a control signal for the memory 122 and transmitting the data read out from the memory 122 to each circuit block, and a time validity flag renewal circuit 121 for determining whether the scheduled transmission time 30 stored in the memory 122 is an effective value or not and updating the time validity flag 31.

The meaning of the time validity flag will now be described. The timer 16 for determining a shaping time is normally constructed as a counter having a finite number of bits. In this case, however, it indicates the same time for each constant or fixed cycle determined according to the number of bits of the counter. Namely, even if a given scheduled transmission time is stored in the memory 122, whether the given time indicates the proper scheduled transmission time or improper (long past) time at which the counter has been counted up over one cycle or period, cannot be determined. The time validity flag 31 is used to discriminate between the two. The time validity flag 31 is a flag which is brought to '1' when the scheduled transmission time 30 indicates the proper time and which is brought to '0' when the scheduled transmission time 30 indicates the improper time at which the counter has been counted up over one cycle.

The operations of the shaping unit 1 performed when a packet is received from the packet transmission unit 4 via the bus 9 to transmit the packet to the corresponding output line will be explained. Incidentally, the sorting circuit 17 performs sorting similar to the sorting method shown in the Prior Art 1.

(1) Packet Receiving Operation:

Now, the packet receiving operation indicates operation at that time that the shaping unit 1 receives a packet from the packet transmission unit 4 via the bus 9.

When the shaping unit 1 receives a packet therein, the queue decision circuit 11 first determines whether the received packet should be queued into its corresponding priority queue 100 or non priority queue 101. In the case of an IP packet, for example, the determination of the queue is carried out by using information, which corresponds to the information in fields shown in crosshatch form in FIG. 4, such as the type of service, packet length, the type of protocol, SIP (Source IP Address), DIP (Destination IP Address), etc. lying within a header of each received packet.

When the queue for queuing the received packet is determined, the received packet is queued into the packet buffer 10. A signal 1100 indicative of the queue into which the received packet has been queued, is transmitted to the scheduled transmission time calculator 13 simultaneously with the queuing of the received packet. The scheduled transmission time calculator 13 reads out the scheduled transmission time 30, time validity flag 31 and packet validity flag 32 related to the queue into which the received packet has been queued, from the scheduled transmission time storage 12.

Figure 9:
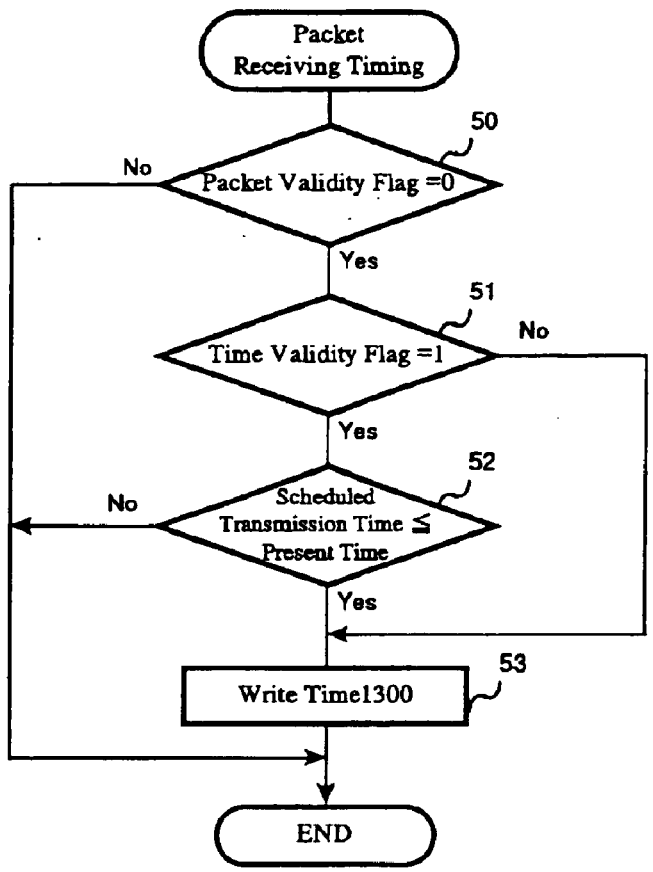
FIG. 9 is a flow chart for determining a scheduled transmission time at packet reception.

Operating rules for the selector 132 provided within the scheduled transmission time calculator 13 are shown in FIG. 5 and an on-reception flow chart is shown in FIG. 9.

When the packet validity flag=1 (see Step 50 in FIG. 9), this means that at least one packet is already queued and a scheduled transmission time for the first transmission-wait packet thereof has been calculated. Therefore, the scheduled transmission time is not updated. When the packet validity flag=0 and the time validity flag=0 (see Step 51 in FIG. 9), the received packet should be queued into a vacant queue and the scheduled transmission time should be updated because the stored scheduled transmission time becomes invalid since a sufficient time has already elapsed. When the packet validity flag=0 and the time validity flag=1, the stored scheduled transmission time indicates a valid time.

When the stored scheduled transmission time is in the future as compared with the present time (see Step 52 in FIG. 9), the scheduled transmission time is never updated to prevent a shaping interval from being narrowed. When the stored scheduled transmission time is the same time as the present time or lies in the past as compared with the present time, an interval exceeding the shaping interval is already formed. In this case, since the shaping interval can be kept even if a packet is immediately read out, the scheduled transmission time may be updated.

All the renewals of the scheduled transmission times at packet reception are intended for execution of packet immediate reading out. Therefore, when the scheduled transmission time is updated, the scheduled transmission time 1300 calculated by the immediate read out time calculator 130 is overwritten onto a scheduled transmission time region or area 30 in the scheduled transmission time storage 12 (see Step 53 in FIG. 9). Since the corresponding queue has received the packet therein, the packet validity flag 32 is always set to 1. The scheduled transmission time set for each user is also changed according to rules similar to the above.

Although the scheduled transmission time for the queue from which a packet should be transmitted with the highest priority is also stored in the scheduled transmission time storage 12 as described above, there is a possibility that the queue with the highest priority has been changed because the scheduled transmission time 30 and the packet validity flag 32 have been updated according to the packet reception. Therefore, the sorting circuit 17 performs sorting on the basis of the updated information to select a queue with the highest priority.

(2) Packet Transmitting Operation:

Now, the packet transmitting operation indicates the operation of transmitting a packet from the shaping unit 1 to its corresponding output line. The packet transmission is carried out in asynchronization with the packet reception.

In FIG. 1, the packet read out circuit 14 reads out the scheduled transmission time 30, time validity flag 31 and packet validity flag 32 for each user to be performed packet transmission with the highest priority, all of which have been stored in the scheduled transmission time storage 12. A user is judged to be able to transmit packets only when the packet validity flag (32)=1, the time validity flag (31)=1 and the scheduled transmission time (30)≦present time, that is, when the scheduled transmission time is past or present. Otherwise, since even the packet for the queue to be transmitted with the highest priority is in an non-transmittable state, it is not possible to transmit packets from all the queues.

Upon transmission of a user packet to be transmitted with the highest priority, the packet read out circuit 14 next reads out a scheduled transmission time 30, a time validity flag 31 and a packet validity flag 32 for a user packet to be transmitted with the highest priority for the corresponding user. The packet is read out only when the packet validity flag 32=1, the time validity flag 31=1 and the scheduled transmission time 30≦present time. In the other case, no packet is transmitted from any queue. When a priority queue and a non priority queue for the same user are both in a readable state, a packet for the priority queue is transmitted inevitably by perfect priority control.

A packet read from the packet buffer 10 by the packet read out circuit 14 is transferred to the priority information supplement circuit 15 where priority information is supplemented to the packet. The priority information represents a service type field (Type of Service in FIG. 4) in the case of an IP packet and a CLP bit in the case of an ATM cell. The priority information supplement circuit 15 gives high priority to a packet read out from the priority queue 100 and gives a low priority to a packet read out from the non priority queue 101, and transmits the packet to its corresponding output line.

When the packet is transmitted, the scheduled transmission time 30 is updated for the next packet queued into the same queue. Upon packet transmission, a signal 1400 indicative of the type of cell-transmitted queue is sent to the scheduled transmission time calculator 13.

Figure 10:
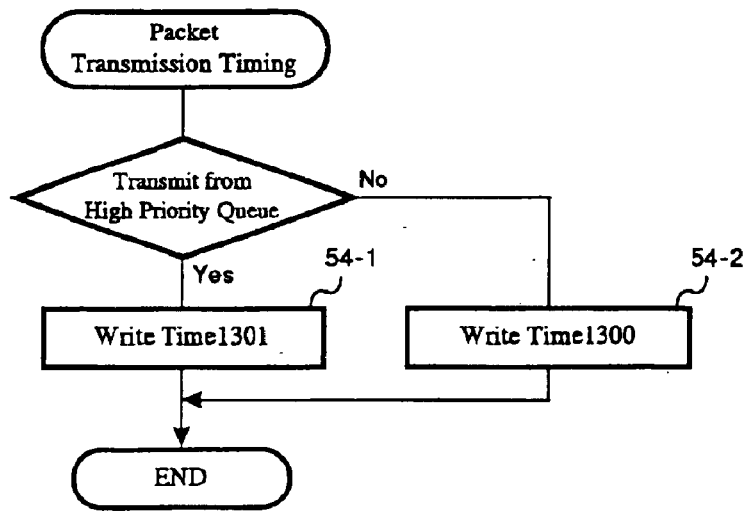
FIG. 10 is a flow chart for determining a scheduled transmission time at packet transmission.

FIG. 5 shows the operating rules for the selector 132 provided within the scheduled transmission time calculator 13 and FIG. 10 shows an on-transmission flow chart.

When the transmitted packet corresponds to a packet read out from a priority queue, the selector 132 selects the result of calculation 1310 by the guaranteed bandwidth read out time calculator 131 to keep a guaranteed bandwidth (see Step 54-1 in FIG. 10). Since immediate reading out may be carried out when a packet read out from a non priority queue is transmitted, the selector 132 selects the result of calculation 1300 by the immediate read out time calculator 130 (see Step 54-2 in FIG. 10). The selected scheduled transmission time is overwritten onto its corresponding scheduled transmission time area 30 of the scheduled transmission time storage 12. Simultaneously, a user-by-user scheduled transmission time is also updated and overwritten onto its corresponding scheduled transmission time area.

When a queue becomes empty (queue length=0) due to the transmission of the packet, the packet validity flag=0 is stored in the scheduled transmission time storage 12. When the queue is riot emptied (the queue length>0) even if the packet is transmitted, the packet validity flag 32 (=1) in the scheduled transmission time storage 12 is not updated and the time validity flag is kept in a state of "1".

Figure 8:
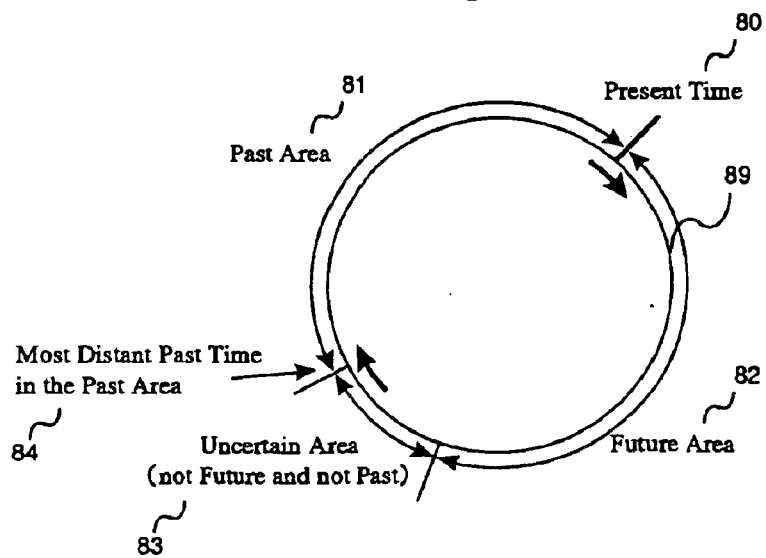
FIG. 8 is a conceptual diagram of a shaping timer configured using a counter having a finite number of bits.

(3) Time Validity Flag Updating Operation:

In the present invention, a timer having such a structure as shown in FIG. 8 is used.

A given time value on a timer 89 having a finite number of bits indicates the present time 80. This value is counted up at a predetermined speed and it gains in a clockwise direction. The counting up speed depends on a bandwidth of a transmit destination line. An area in which the present time 80 has already elapsed, corresponds to a past area 81, and an area to which the present time 80 has not yet been attained, corresponds to a future area 82. An uncertain area 83 is provided at a contact portion of the past area 81 and the future area 82, which does not correspond to the present time 80. The uncertain area 83 is an area which is neither the past nor the future and always kept at a predetermined distance (time difference) as counted from the present time.

If the uncertain area 83 is not provided, such an inconvenience arises in that a scheduled transmission time kept past at a certain time would result in a future time by one gain of time alone, so that proper shaping cannot be carried out. The scheduled transmission time 30 stored in the memory 122 results in a time in the past area 81 without being updated. In the present invention, the time validity flag is brought to '0' when the time further gains and thereby the scheduled transmission time 30 reaches a time in the uncertain area 83.

The operation of the time validity flag renewal circuit 121 provided within the scheduled transmission time storage 12 will be explained by referring a flowchart shown in FIG. 11.

Figure 11:
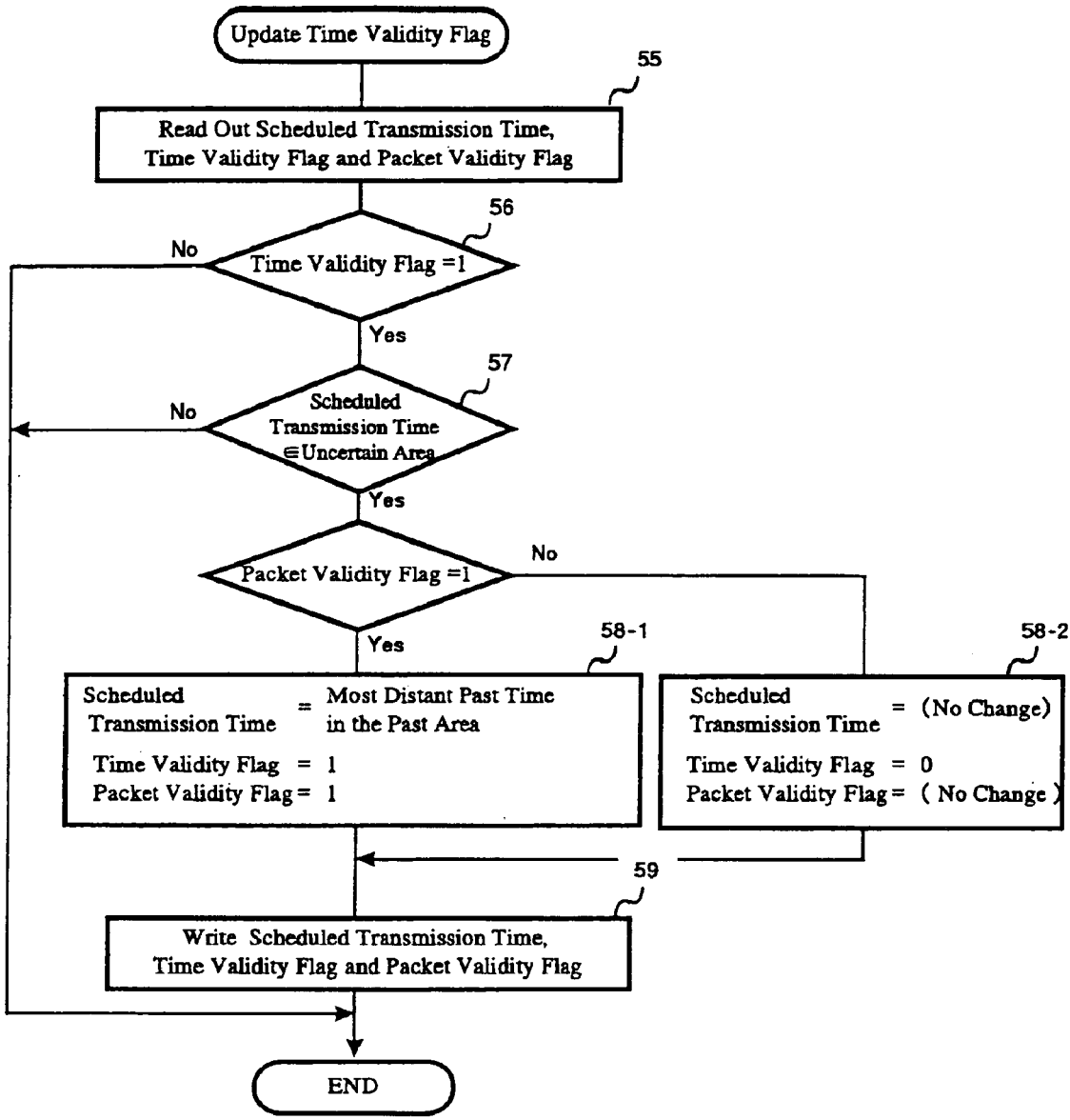
FIG. 11 is a flow chart for updating a time validity flag.

The time validity flag renewal circuit 121 first reads out a scheduled transmission time 30, a time validity flag 31 and a packet validity flag 32 set for each queue from the memory 122 (see Step 55 in FIG. 11).

When the read out time validity flag (31)=0, since the scheduled transmission time 30 has been already judged to be invalid, all the information are not updated (see Step 56 in FIG. 11). When the time validity flag (31)=1 and the scheduled transmission time 30 does not exist within the uncertain area 93, since the scheduled transmission time 30 is still valid, all the information are not updated (see Step 57 in FIG. 11).

When the time validity flag (31)=1, the scheduled transmission time 30 lies within the uncertain area 93, and the packet validity flag (32)=1, a transmission-wait packet still exists and hence the time validity flag will never be brought to 0. In this case, the scheduled transmission time is brought up to a time (see 94 in FIG. 9) most distant from the present time within the past area and written back to the memory 122. The time validity flag and the packet validity flag both remain held at 1 and are written back to the memory 122 without their renewal (see Steps 58-1 and 59 in FIG. 11). When the time validity flag (31)=1, the scheduled transmission time 30 lies within the uncertain area 93, and the packet validity flag (32)=0, no transmission-wait packet exists.

Hence the scheduled transmission time and the packet validity flag are written back to the memory 122 without their updating, and the time validity flag is brought up to 0 and written back to the memory 122 (see Steps 58-2 and 59 in FIG. 11).

A description will next be made as to the timing of time updating.

If a certain queue is left without updating within the uncertain area 93, the scheduled transmission time enters the future area with the time validity flag=1. In this case, proper shaping cannot be carried out in a manner similar to the non-provision of the uncertain area 83. It is necessary, therefore, to effect the above-described time validity flag updating operation once or more on all the queues within the uncertain area. This can be easily implemented by updating the scheduled transmission time in a cycle less than or equal to a time width of the uncertain area.

While FIG. 1 has shown the example in which both the priority queue 100 and the non priority queue 101 exist one by one for each user, a plurality of priority queues and a plurality of non priority queues may be provided for each user. If the number of queues increases, then such finer priority control that even in the case of the same electronic-mail traffic, for example, an electronic mail for a user A is transferred in preference to an electronic mail for a user B, can be performed.

When a plurality of priority queues are prepared for each user, parameters for a leaky bucket algorithm must be set in such a manner that a guaranteed bandwidth results in the sum of transmission bandwidths of the plurality of priority queues. Further, when a plurality of non priority queues are prepared, a perfect priority control in which all packets in a high level queue always take preference over the others, or a Weighted Round Robin control in which packets for a high level queue and a low level queue are transmitted at a predetermined ratio (e.g., 2:1), for example, may be applied as a control method for controlling the priority between the non priority queues.

According to the embodiment of the shaping unit described above, the shaping is effected on the priority packets within the minimum guaranteed bandwidth. Therefore, if the input bandwidth is greater than the minimum guaranteed bandwidth, there is a possibility that some of the queues become an overflow status and overflowed packets might be discarded. In order to prevent this status, the function of transmitting packets at the maximum without keeping the minimum guaranteed bandwidth when the queue is likely to overflow may be added.

In the shaping unit shown in FIG. 1, the result of calculation by the guaranteed bandwidth read out time calculator 131 is applied as a scheduled transmission time for the next packet when the priority packet is transmitted. In this case, the above function can be easily implemented by referring to a queue length of a priority queue and modifying a selection condition according to the queue length. Namely, the condition of the selector 132 may simply be modified in such a manner that when the queue length of the priority queue is smaller than a pre-set threshold, the result of calculation by the guaranteed bandwidth read out time calculator 131 is applied as a scheduled transmission time for the next packet, and when the queue length of the priority queue is larger than the threshold, the result of calculation by the immediate read out time calculator 130 is applied as a scheduled transmission time for the next packet. Priority packets corresponding to a bandwidth exceeding the guaranteed bandwidth will not be discarded by UPC on the network side if transmitted with low priority.

If the input bandwidth for the priority packets is small, a transmission bandwidth for packets to be transmitted with high priority falls below the guaranteed bandwidth. In this case, the guaranteed bandwidth chiefly intended for accounting cannot be utilized effectively. In order to effectively use the guaranteed bandwidth, the packet read out circuit 14 may read out packets from a non priority queue, and the priority information supplement circuit 15 gives high priority to these non priority packets when no transmit-wait packet exist in a priority queue even if the scheduled transmission time for the priority queue is reached.

FIG. 12 shows the manner of packets transmitted to the public network 99-1 from the packet forwarding device 98 provided with the shaping unit 1 described above.

An upper half of FIG. 12 indicates time intervals of transmitted packets wherein the horizontal axis is set as a time axis. A lower half of FIG. 12 indicates changes in transmission bandwidth at each individual times.

A user is transmitting packets at a bandwidth between the minimum guaranteed bandwidth and the maximum contracted bandwidth (Area 1). When the number of users who transmit packets simultaneously increases, the transmission bandwidth for each user is reduced, but it does not fall below the minimum guaranteed bandwidth (Area 2). Further, when the number of users decreases, the transmission bandwidth for each user increases up to the maximum contracted bandwidth (Area 3). In any case, high priority packets are transmitted ensuring a constant or fixed bandwidth without depending on the number of users. Low priority packets are transmitted at vacant or available bandwidth only when there is allowance for a bandwidth of a communication path or channel.

Figure 13:
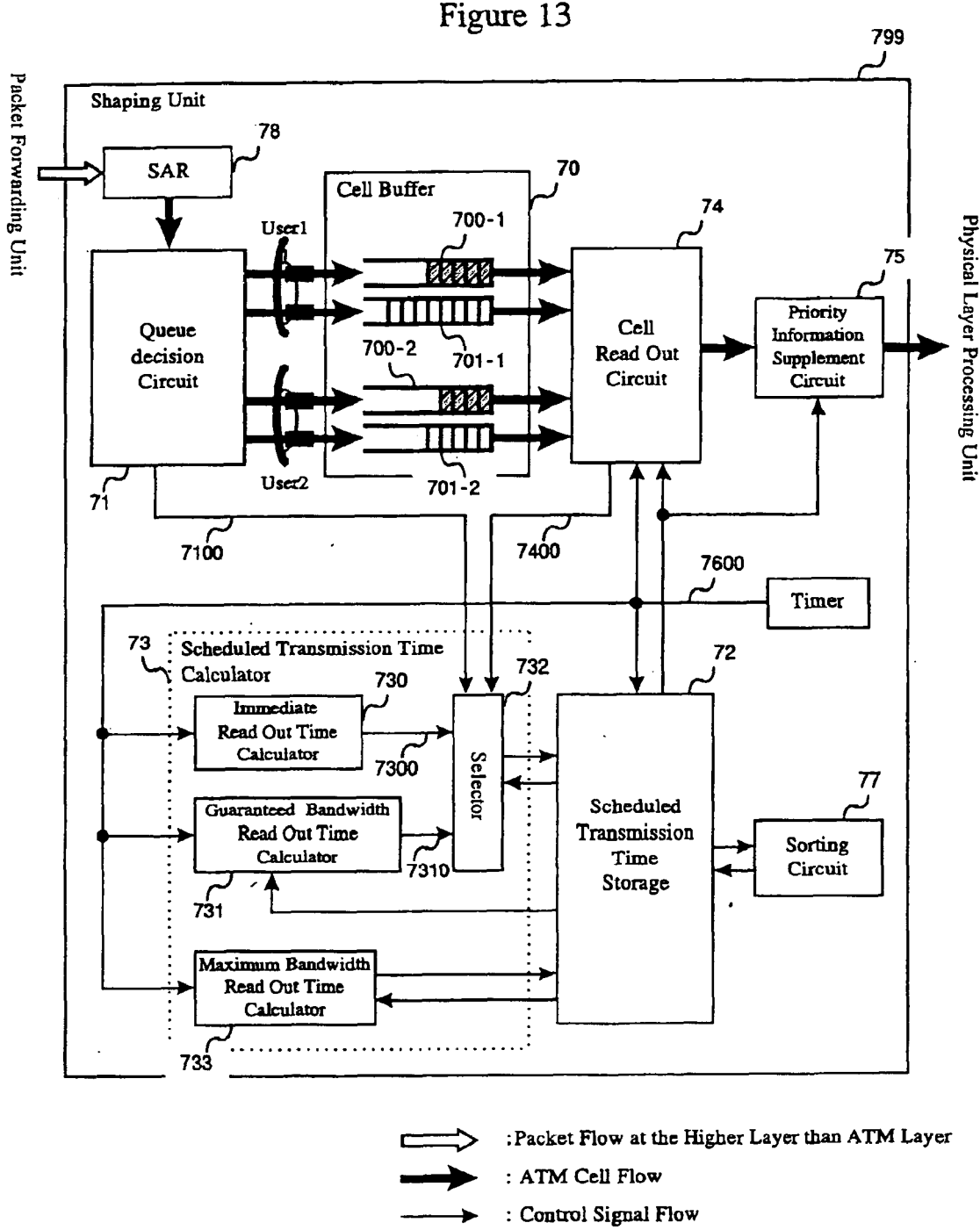
FIG. 13 is a block diagram illustrating a configuration of one embodiment of a GFR traffic shaping unit to which the present invention is applied.

A shaping unit for GFR, which makes use of an ATM cell, will be described as a second embodiment. FIG. 13 shows a block diagram of the shaping unit for GFR.

The ATM cell is a 53-byte fixed-length packet. One packet for an upper layer is comprised of a group of one or more cells. When different packets are mixed together within the same VC, it is not possible for the receiving terminal side to identify delimitation between the packets. Thus, a cell read out circuit 74 is provided with the function of continuously reading out cells which belong to the same upper layer packet and transmitting the same. Further, a queue decision circuit 71 determines a queue for queuing each received ATM cell by referring to VPI, VCI and CLP within a header of each received ATM cell.

The final cell of the upper layer packet can be identified by a payload type (3 bits) within a cell header. When the type of payload is given as "000" or "010", it indicates the leading or first cell or intermediate cell. When the payload type is given as "001" or "011", it indicates the final cell. The other values indicate that the cell is a managing cell, such as an OAM cell or RM cell.

The operation for receiving the ATM cell is different from that for receiving an IP packet in the following points.

When a packet for an ATM upper layer is received, an SAR (Segmentation and Reassembly) 78 first divides the packet into data blocks each having 48 bytes, to which 5-byte ATM headers are added to form ATM cells. These ATM cells are transferred to the queue decision circuit 71. When the leading cell or intermediate cell of the upper layer packet is received, the queue decision circuit 71 does not update a scheduled transmission time, a time validity flag and a packet validity flag. Only when the final cell of the upper layer packet is received, the queue decision circuit 71 performs update of the scheduled transmission time, the time validity flag and the packet validity flag. Processing at final cell reception is identical to rules for the IP packet (see FIG. 14).

A point of difference between on-cell transmission and on-IP packet transmission will next be explained.

Since a bandwidth guarantee must be effected on an upper layer packet, it is necessary to continuously read out cells when the leading cell or intermediate cell of the upper layer packet is transmitted as described above. Accordingly, in this case, the cell read out circuit 74 provides instructions 7400 regardless of whether the queue having transmitted a cell belongs to a priority queue or non priority queue, in such a manner that a selector 732 within a scheduled transmission time calculator 73 selects the result of calculation 7300 by an immediate read out time calculator 730 as a scheduled transmission time. On the other hand, when the final cell of the upper layer packet is transmitted, a scheduled transmission time is selected according to the same rules as upon IP packet transmission (see FIG. 14).

According to the IP packet shaping unit 1 of the present invention, as described above, a shaping unit for GFR can be easily constructed by simply adding the condition based on the final cell and the leading or intermediate cell to the condition for the selector within the scheduled transmission time calculator.

According to the present invention, as described above, a shaping unit is provided in which important packets can be transmitted as high priority packets at a guaranteed bandwidth, and when a vacant or available time exists between the important packets, non-important packets can be transmitted closely as low priority packets. Thus, according to the present invention, when a network is not busy, packets can be transferred at the maximum bandwidth. Even when the network is busy, the important packets can be transferred at the guaranteed bandwidth, thereby to effectively use the bandwidth for a communication path or channel. Further, when the volume of traffic for the important packets is small, non-important packets can be transmitted as high priority packets, so that the guaranteed bandwidth can be utilized to the maximum.

According to the present invention, a shaping unit for GFR service, which carries out UPC in units of an upper layer packet in an ATM network, is also offered, whereby upper layer packets can be transmitted at the maximum bandwidth when a network is not busy, and upper layer priority packets can be transmitted at a guaranteed bandwidth even when the network is busy.

What is claimed is:

1. A packet forwarding device connected to a packet forwarding network, comprising:
   a packet transmission unit for determining a transmit destination by referring to destination information described in a header of each of received packets; and
   a plurality of line interfaces each corresponding to the type of connected line;
   at least one of said line interfaces having a traffic shaping unit, said traffic shaping unit comprising:
   priority queues prepared for each output destination for storing therein packets to be transmitted within a guaranteed bandwidth, which are received from said packet transmission unit;
   non priority queues prepared for each output destination for storing therein packets to be transmitted at a bandwidth other than the guaranteed bandwidth, which are received from said packet transmission unit;
   a queue decision circuit having the function of determining priority by referring to user information and information about priorities both described in the header of each of packets received from said transmission unit and queuing the packet into on either of a priority queue or a non priority queue for each output destination;
   a scheduled transmission time calculator for calculating a scheduled transmission time for a leading one of transmit-wait packets for each of said queues;
   a scheduled transmission time storage for storing therein the scheduled transmission time for each of said queues and a scheduled transmission time for one of said queues from which a packet should be transmitted with the highest priority, each of said scheduled transmission times having been calculated by said scheduled transmission time calculator;
   a sorting circuit for selecting a queue from which a packet should be transmitted with the highest priority by referring to the scheduled transmission times for each of said queues stored in said scheduled transmission time storage;
   a packet read out circuit for reading out packets from said queues in accordance with the scheduled transmission time for each of said queues stored in said scheduled transmission time storage and transmitting the same to a line connected with the line interface; and
   a priority information supplement circuit for writing information about priorities in a header of the packet read out by said packet read out circuit.

2. The packet forwarding device according to claim 1, wherein said priority queue exists in plural form with respect to the same output destination, and priorities are assigned to the plurality of queues, and
   said packet read out circuit reads out a packet from a queue highest in priority from among the queues in which transmit-wait packets exist, and transmits the read out packet therefrom.

3. The packet forwarding device according to claim 1, wherein said non priority queue exists in plural form with respect to the same output destination, and priorities are assigned to the plurality of queues, and
   said packet read out circuit reads out a packet from a queue highest in priority from among the queues in which transmit-wait packets exist, and transmits the read out packet therefrom.

4. The packet forwarding device according to claim 1, wherein said non priority queue exists in plural form with respect to the same output destination, and priorities are assigned to the plurality of queues,
   said packet read out circuit reads out a packet from a queue highest in priority from among the queues in which transmit-wait packets exist, and transmits the read out packet therefrom, and
   said priority information supplement circuit amends the priority of the queue from which said packet is read out, to the lowest priority.

5. The packet forwarding device according to claim 1, wherein said scheduled transmission time calculator is provided with a first circuit for calculating a scheduled transmission time so as to continuously read out packets, a second circuit for calculating a scheduled transmission time so as to keep a guaranteed bandwidth, and a selector for selecting either of the results of calculations by said first and second circuits as a scheduled transmission time.

6. The packet forwarding device according to claim 5, wherein said selector has the function of selecting the result of calculation by said first circuit for calculating the scheduled transmission time so as to continuously read out packets when the line interface receives a packet,
   selecting the result of calculation by said second circuit for calculating the scheduled transmission time so as to keep the guaranteed bandwidth when the line interface transmits a packet from said priority queue, and selecting the result of calculation by said first circuit for calculating the scheduled transmission time so as to continuously read out each packet when the line interface transmits a packet from said non priority queue.

7. The packet forwarding device according to claim 6, wherein a threshold is set to each of said priority queues in advance, and said selector selects the result of calculation by said second circuit for calculating the scheduled transmission time so as to keep the guaranteed bandwidth when the number of packets stored in the priority queue does not exceed the threshold, and selects the result of calculation by said first circuit for calculating the scheduled transmission time so as to continuously read out each packet when the number of packets stored in the priority queue exceeds the threshold.

8. The packet forwarding device according to claim 1, wherein said priority information supplement circuit writes priority information indicative of a high priority into a header of a read out packet when the packet is read out from said priority queue by said packet read out circuit, and said priority information supplement circuit writes priority information indicative of a low priority into a header of a read out packet when the packet is read out from said non priority queue by said packet read out circuit.

9. The packet forwarding device according to claim 1, wherein said priority information supplement circuit writes priority information indicative of a high priority into a header of a read out packet when the transmit-wait packets do no exist in said priority queue at the scheduled transmission time for said priority queue and a packet is transmitted from said non priority queue.

10. The packet forwarding device according to claim 8, wherein said priority information supplement circuit changes the value of a TOS area within a header of an IP packet as said priority information.

11. The packet forwarding device according to claim 8, wherein said priority information supplement circuit changes the value of a CLP bit within a header of an ATM cell as said priority information.

12. The packet forwarding device with a shaping unit, wherein said shaping unit including, for users, a priority queue for storing high priority packets; and a non priority queues for storing low priority packets wherein said shaping unit further including a scheduled transmission time calculator for setting a scheduled transmission time to a leading packet among transmit-wait packets stored in each of said priority queues so as to keep a guaranteed bandwidth, setting an immediately transmitted time as a scheduled transmission time of a leading packet among transmit-wait packets stored in each of said non priority queues, and setting a scheduled transmission time corresponding to a transmission bandwidth integrating said priority queue and non priority queue.

13. The packet forwarding device according to claim 12, further including a priority information supplement circuit for giving a high priority to a packet read out from each of said priority queues and giving a low priority to a packet read out from each of said non priority queues.

14. The packet forwarding device according to claim 13, wherein said scheduled transmission time calculator refers to a queue length of the priority queue upon calculation of a scheduled transmission time for the priority queue, and sets an immediately transmitted time as the scheduled transmission time without keeping a guaranteed bandwidth when packets exceeding a predetermined amount are stored.

15. A packet priority setting method, comprising the steps of:

reading out a transmit-wait packet from a non priority queue when no transmit-wait packet exists in a priority queue even though the time to transmit a packet from the priority queue is reached; and giving a high priority to the transmit-wait packet read out from the non priority queue.

* * * * *